(12) United States Patent
Spittle

(10) Patent No.: US 6,349,499 B1
(45) Date of Patent: *Feb. 26, 2002

(54) ARTIFICIAL MULCH FOR SEEDLING ESTABLISHMENT

(75) Inventor: Kevin S. Spittle, Stanley, NC (US)

(73) Assignee: Profile Products LLC, Buffalo Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/448,240

(22) Filed: Nov. 24, 1999

(51) Int. Cl.[7] ................................................ A01G 7/00
(52) U.S. Cl. ............................................................ 47/9
(58) Field of Search ....................................... 47/9, 57.6

(56) References Cited

U.S. PATENT DOCUMENTS

| | | | |
|---|---|---|---|
| 4,473,390 A | * 9/1984 | Teufel | ............................. 71/23 |
| 4,827,665 A | 5/1989 | Hubbs, Jr. et al. | |
| 5,017,319 A | 5/1991 | Shen | |
| 5,429,741 A | * 7/1995 | Webb | ........................ 210/242.4 |
| 5,741,832 A | 4/1998 | Spittle | |
| 5,746,546 A | 5/1998 | Hubbs et al. | |
| 5,779,782 A | 7/1998 | Spittle | |
| RE35,989 E | 12/1998 | Hubbs, Jr. et al. | |
| 5,916,027 A | 6/1999 | Spittle | |
| 6,021,598 A | * 2/2000 | Holton | ............................... 47/9 |
| 6,076,299 A | * 6/2000 | Spittle | ............................... 47/9 |
| 6,209,259 B1 | * 4/2001 | Madigan | ....................... 47/57.6 |

FOREIGN PATENT DOCUMENTS

| | | |
|---|---|---|
| EP | 0 161 766 A1 | 11/1985 |
| EP | 0 492 016 A1 | 7/1992 |

* cited by examiner

*Primary Examiner*—Charles T. Jordan
*Assistant Examiner*—Francis T. Palo
(74) *Attorney, Agent, or Firm*—Brooks & Kushman P.C.

(57) ABSTRACT

Flaked mulch products having a density similar to that of seed which is to be established, comprise an agglomerated and compacted natural raw material whose density is adjusted to within 50% of the seed.

22 Claims, No Drawings

ARTIFICIAL MULCH FOR SEEDLING ESTABLISHMENT

TECHNOLOGICAL FIELD

The present invention pertains to artificial mulch for use in seedling establishments. More particularly, the present invention pertains to biodegradable artificial mulch which, when mixed with grass or other crop seeds, does not tend to segregate during shipping and handling.

BACKGROUND ART

Several types of artificial mulches are now commercially produced, each for a particular end use. For example, mulches for hydroseeding and like methods generally contain fluffy, hammered paper compressed into bales which must be time consumably added in small increments to the mulch tank. An improvement in such mulches is disclosed in copending U.S. patent application Ser. No. 08/970,065, which incorporates a surfactant into the mulch material. The surfactant produces more rapid wetting, allowing for much shorter addition times. In such mulches, the seed need not be kept separate from the mulch prior to addition to the mulch tank, as the mulch is generally supplied in a somewhat compacted bale form. If supplied loose, the seed would rapidly segregate during shipment of the mulch, resulting in portions of mulch with too high a seed content, and portions with too low a seed content.

Mulch and seed mixtures for crop establishment, particularly turf grass establishment, are available. Such products are spread in a dry state onto fields or, in particular, onto bare patches of soil. The mulch serves several purposes, primary of which are protecting of the seed from birds, protecting the seed from direct sunlight, and maintaining a moisture content which encourages germination. Seed mulches such as these are generally prepared from paper by hammer milling and like processes, producing a low density, fluffy product. Seed rapidly segregates from such mixtures. An improvement in seed-containing mulches is the preparation of mulch from paper and finely divided wood products, as disclosed in the inventor's own U.S. Pat. No. 5,916,027. The mulch thus prepared has a density close to that of seed, and thus seed is less likely to segregate during shipping and storage. However, the paper/wood product mulch of the U.S. Pat. No. 5,916,027 patent suffers from the disadvantage that wood products such as sawdust, and waste paper, are not always available.

SUMMARY OF THE INVENTION

The present invention provides for a preferably lignocellulosic mulch product which has a density adjusted to the density of the seed with which the mulch is to be used, and which is prepared from a variety of lignocellulosic starting materials. The invention also provides for unique mulch products, including mulch products having seed attached or incorporated within mulch flakes.

DESCRIPTION OF PREFERRED EMBODIMENT

The mulch flakes of the present invention may be prepared from any mix of lignocellulosic materials which allow the targeted density to be obtained. The targeted density is a density within ±50% of the average density of the seed to be mixed with the mulch, preferably within ±30%, more preferably within ±30%, and most preferably within ±10% of seed density.

The mulch may have any shape which is adapted to enable the mulch to perform its intended functions, for example assisting in maintaining the mulch and seed in location despite rain and watering; protecting the seed from the direct sun; and maintaining an adequate moisture level. Not all these functions must necessarily be met, and the mulch may serve other functions as well. It is preferable that the mulch be supplied in a flake form, i.e. in irregular platelets with a thickness which is less than the dimensions across the platelet. However, other shapes are useful as well, for example shapes resembling seeds, with aspect ratios of 1:1 to 1:10; preferably 1:1 to 1:5; long strips with aspect ratios greater than 10:1, and the like. It may be preferable to employ mixtures of several shapes in particular applications. While the density of the mulch flakes should approximate that of the seed, it would not detract from the invention to add less dense mulch products in small quantities, preferably less than 30% by weight, more preferably less than 15% by weight, and in particular less than 10% by weight. Low density diluents include those with a bulk density less than 4 lb/ft$^3$, including products such as paper, shredded corn stalks, chopped wheat straw, and similar products.

The mulch flake material is preferably prepared from lignocellulosic materials. A wide variety of such materials are available, and include, without limitation, paper, sawdust, wood shavings, wood chips, excelsior, straw, seed husks, sterilized (denatured) seed products, coconut husks, copra, rice hulls, dried seaweed, yard waste, chipped bark, peat, compost, cotton, cotton linters, and the like. Alternative sources for mulch production include waste byproducts from industrial processing which are derived from natural sources, such as sewage sludge, which also generally and preferably contain some amount of lignocellulosic waste. An example is the raw material used to prepare Millorgorite™ fertilizer. These products may be used together with more traditional lignocellulosic feed stocks, or may be added to the product in admixture.

The particular selection of raw materials and their processing are dependent on the materials available and the target density. For example, a product of lower density may be made by including substantial unprocessed or partially processed materials such as paper, straw, chopped corn stalks, etc., into the mulch mix prior to agglomerating the mulch into its final form. To make a more dense mulch, the lignocellulosic materials may be more finely divided and/or more intensively processed prior to agglomeration and shaping. It is far more desirable to alter the density of mulch by incorporating less dense materials prior to shaping rather than to mix dry low density mulch with higher density mulch.

The processing of the mulch referred to above involves dividing the mulch raw materials to the desired size and shape, followed by optionally compounding, agglomerating, and shaping. These steps are not necessarily separate.

One form of processing involves digestion of the lignocellulosic products. In such a process, the lignocellulosic raw material is digested by means of superheated steam for an extended period. The heat and moisture causes breakdown of the lignocellulosic components to form a product which is easily extrudable or otherwise processable. If the heat is performed for a long enough period, for example, as disclosed in U.S. Pat. No. 5,017,319 and European Patents EP-A-O 161 766 and EP-A-O 492 016, all herein incorporated by reference, the raw materials will generate a natural "adhesive" binder which, following extrusion, will maintain the integrity of the extrudate prior to additional shaping operations such as chopping, shredding, flaking, etc. This intrinsic binder may be used in lieu of or in conjunction with other binders, permitting less use of the latter.

Alternatively, the lignocellulosic or other raw materials may be admixed with natural or synthetic binders, whether the raw materials are digested or undigested. Examples of synthetic binders include epoxy and novolac resins, phenol/formaldehyde condensates and like condensates employing in lieu of or in addition to phenol, melamine, urea, guanidine, biurea, and the like. Because the structural integrity of the mulch flake is not required to be of the same level as industrial products such as low, medium, and high density particle board, flake board, and the like, the amount of synthetic condensates necessary to provide the required integrity may be relatively low.

The amount of synthetic binder may be reduced further by addition of natural binders such as modified or unmodified starches, sugars, syrups, gums, and the like. Examples of natural and chemically modified natural binders include fructose, sucrose, molasses process residue, carboxymethylcellulose, hide glue, fish glue, shellac, mucilage, psyllium, gum tragacanth, gum acacia, guar gum, corn starch, arrowroot starch, montan wax, carnauba wax, beeswax, and the like. In general, some binder, whether generated by digestion or separately added, is preferably used. If synthetic binders are used, it is preferable to employ synthetic binders which will decompose to generate nitrogenous fertilizer components such as condensates, particularly formaldehyde condensates of urea, biurea, guanidine, and the like. Thus, urea/formaldehyde, guanidine/formaldehyde, and like synthetic binders are preferred, when synthetic binders are utilized. However, binders such as polyacrylic acid, generally available at relatively low cost, are also suitable.

To the raw materials may also be added various additives such as dyes and pigments, germination aids, fertilizer, and in particular, one or more surfactants and/or water absorbing substances. Surfactants may be added to encourage rapid water update and retention. Water absorbent materials such as polyacrylic acids, other polyacrylates, and the like may be used. In some uses, such synthetic polymers may also serve as the binder, e.g., polyacrylic acid, polyacrylamides, and the various acrylate, acrylic acid, and acrylamide co- and terpolymers. A preferred polymer is Tacking Agent III, a polyacrylamide polymer which absorbs five to ten times its weight of water, formerly available from Spittle Enterprises, and now available from Profile, Inc., Chicago, Ill. Other polyacrylate-type polymers, commonly termed "super slurpers" by some, may be used. Examples of polyacrylates include Carbopol™ 940, a polyacrylic acid thickener, Acrysol™ polyacrylates, and like products. Particularly preferred are natural products such as ground plantago (plaintain) and similar products which are naturally adhesive as well as being capable of absorbing a large quantity of water, as disclosed in U.S. Pat. No. 5,741,832.

Following digestion, which is preferable, or following other means of agglomeration of finely comminuted particles, for example addition of natural and/or synthetic binders, and prior to compaction, the density of the mulch product may be adjusted to generally lower values by adding less finely comminuted and less processed materials such as paper flakes, chopped grass, straw, leaves, and the like.

Following agglomeration of the raw materials, whether by processing to form natural binders by digestion, addition of natural or synthetic binders, or the like, and following addition of desired additives, the product is processed for example by kneading, rolling, or other conventional techniques, when necessary, to a stage where it can be suitably extruded, flaked, or granulated, either in one step or a plurality of steps. For example, in a preferred method, extrudates having nominal diameters of from 2 mm to 8, preferably 3 mm to 6 mm, and most preferably about 4 mm are prepared. The length of such extrudates may vary from between 15 mm and 60 mm, preferably from about 20 mm to 40 mm, and most preferably about 35 mm in general. The extrudate may be stored or shipped as is, with finer comminution into flakes taking place later. Alternatively, the extrudate may be flaked by slicing or otherwise comminuting into platelets upon exit from the extruder or thereafter.

In addition to extrusion methods, the mulch may be tableted, prilled, processed as a compressed sheet product, or the like. The tablets, prills, extrudate, broken sheet material, and the like may be shipped in bulk to be granulated or flaked at a distant location, or may be processed into mulch flakes on the spot and admixed with seed, if desired. It is necessary, regardless of the means of compacting, that the uncompacted precursor contain enough binder, surfactant, water absorber, and like compounds, to produce a product which can withstand the rigors of further comminution (when practiced), storing, without breakdown into fine particles. The flakes, prills, etc., which are produced must also be a limited period of time, as is well known.

Unlike prior art mulches, a variety of cellulosic products may be used to prepare the subject mulch flakes. The methods of preparation, particularly those which avoid incorporation of large amounts of paper product, provide a density which can be closely matched to the seed desired to be sown. Moreover, following heat processing, the process of the present invention allows seed to be admixed with the mulch material, and thus to be encapsulated and/or bound thereto.

The density of the consolidated product, prior to flaking or other comminution, is generally between 10 lb/ft$^3$ and 40 lb/ft$^3$, more preferably between 20 lb/ft$^3$ and 35 lb/ft$^3$, typically between 30 lb/ft$^3$ and 35 lb/ft$^3$. However, when comminuted into flakes or other particles, the bulk density should preferably range from about 5 lb/ft$^3$ to about 20 lb/ft$^3$, more preferably 10 lb/ft$^3$ to 15 lb/ft$^3$.

The mulch flakes having this composition and produced by this process preferably have a size of about ⅛" to ⅜" in the longest dimension, and are preferably up to about ⅛" thick, at most. The size can be adjusted as desired so that the size of the finished mulch flakes approximates the size of the grass seed with which the mulch flakes are mixed to form the turf grass re-seeding product or is larger as desired. The resulting flake is substantially free of dust and needs to be applied at thicknesses of only about one-eighth to one-quarter inch, which places the seed much closer to the soil surface at application as compared to the paper matrix based lawn patch products. This allows the grass seed to more easily establish itself in the soil, resulting in greater plant coverage rates. Additionally, since the mulch flakes have a density of about ten to fifteen pounds per cubic foot, which is four to six times the density of the paper-based lawn patch products, only one quarter to one-sixth of the volume of the product is necessary for the same coverage rates. This translates into reduced packaging, shipping, and store display space and cost.

A suitable composition includes waste paper and saw dust. The finely-divided paper may be made from waste paper, in which case the mulch flakes preferably include about 80% paper. The finely-divided wood may be sawdust, in which case the mulch flakes preferably include about 20% wood. The surfactant may be polyalkylene glycol. The mulch flakes preferably include at least about 0.2% surfactant. The high surfactant level causes the flakes to very quickly absorb a substantial amount of water. The mulch flakes may also include water absorbent polymer such as guar gum or other water absorbant substances as heretofore described, in combination with the surfactant, the polymer causes extreme water absorption by the mulch flakes. This causes the mulch to expand tremendously when watered, resulting in the coverage in a greater percentage of the seed bed area, which then provides greater protection to the seed bed from water and wind. Additionally, the extreme water absorption reduces water run off, therefore, reducing soil loss. The polymer itself helps to hold the flake together and keep it from falling apart as it swells as it absorbs water. The polymer also increases the stickiness of the water-saturated mulch, which helps to retain the mulch in place on the seed bed.

A preferred composition comprises mulch flakes of this invention comprise an intimately-mixed formulation of finely-divided paper, and/or finely-divided wood, shaped into a flake with a density of about 5–20 pounds per square foot. The flakes may include a surfactant, and a typical turf grass N-P-K- type fertilizer for use in newly seeded areas. The finely-divided paper and wood are extremely water absorbent in and of themselves. The addition of a surfactant increase the water retention of the paper and wood particles, and also speeds water absorption. It can double water retention and increase the absorption rate 20 fold.

One preferred embodiment of the mulch of this invention (before mixing with the fertilizer) includes: about 80%±2% finely-divided paper, about 20%±2% finely-divided wood, and about 0.2% polyalkylene glycol (a surfactant), and more preferably 0.3%±0.1% polyalkylene glycol. The mulch may include about 0.4% dark green marker dye. The mulch may also include about 1% guar gum (a water absorbent polymer), and about 0.1% of a bio-stimulant such as cold water pressed Ascophyllum Nodosum, which is a seaweed extract. The bulk density of the flakes is typically from about 5 to about 20 pounds per cubic foot (pcf), and more preferably 10–15 pcf. All percentages are weight percentages of dry mulch mixture before addition of any moisture.

The mulch flakes can be produced as follows. Waste newspapers are shredded and processed through a hammer mill. The resulting paper pieces are then introduced into a finish hammer mill. Also added to the finish hammer mil is the appropriate amount of sawdust. The approximate sizes of these components added to the finish hammer mill is as follows. The paper pieces about ¼ to ¾ inch in length, and the sawdust sized to pass through a 20 mesh screen. The mixture exiting the finish hammer mill has added to it the correct amount of marker dye, liquid surfactant and water-absorbing polymer, if desired. Granular fertilizer is then added if desired.

The entire mixture is then processed through a conditioner, in which the correct amount of moisture is sprayed into the mixture as a fine mist as the product is agitated. The mixture is then pelletized into pellets of 3/16 inch diameter, with a length of about 1–1¼ inches. The pellets have a bulk density of about 30–35 pounds per cubic foot. The product is then cooled, to harden and dry the outside skin, to prevent mold growth, and keep the pellets from breaking apart during shipping and application.

The pellets are then granulated into flakes, having a bulk density of about 10–15 pounds per cubic foot, using known granulation equipment.

In further preferred embodiments, a portion or all of the waste paper is replaced with chopped straw or other natural products. When low density preparations are desired, the chopped straw raw material is added just prior to extrusion, i.e., it is not processed intensively, thus retaining some of its airy, cellular nature. If a more dense product is desired, the straw may be much more finely divided. For the highest density products employing straw, the straw may be digested with live steam. In such cases, straw or other lignocellulosic raw materials may also replace wood byproducts, and yet a relatively dense product may be obtained.

The mulch of the present invention may also be initially prepared with a binder such that at modest temperatures, i.e., less than about 50° C., the product remains pasty. In such cases, grass or crop seed may be added to the moist product and incorporated directly, prior to being dried and comminuted. Upon comminution, some seed will remain embedded within mulch particles, a fair percentage will be exposed but will be still attached to mulch particles, while some will be entirely set free. Such mulch products are not believed heretofore available. In a further embodiment, seeds and flakes mulch are adhered to each other by use of a binder, for example shellac, wax, phenol/urea condensates, and the like.

The mulch products may also include synthetic or natural fibers to allow the mulch to mechanically bind itself together. Examples of such fibers are disclosed in U.S. Pat. No. 5,778,782 herein incorporated by reference.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

By the term "agglomerating" is meant treatment of the lignocellulosic-containing raw material with heat to provide a natural binder, and/or addition of other natural and/or synthetic binders which are effective to allow the compacted and dried material to have sufficient integrity to withstand subsequent comminution, storage, and shipment without generating excessive fines. In the agglomerating stage, additives such as fertilizer, binder, surfactant, density adjusting materials and the like are generally added and mixed to form a somewhat "loose" material capable of later consolidation.

By the term "compacting" is meant extrusion under pressure, pressure rolling, prilling or other techniques which compact the agglomerated material into a form which has some degree of structural integrity, and which, following drying, can maintain its shape or be comminuted appropriately. Compaction may take place simultaneously with agglomeration.

By density is meant the density the density of the processed granulate measured, where appropriate, at the same conditions of temperature and humidity which the density of seed is measured. The term "bulk density" is used in its ordinary meaning, the apparent density of a quantity of particles which include air space surrounding the particles.

By the term "substantially unprocessed" with regard to density-adjusting substances is meant that these substances are not ground or otherwise processed (i.e., digested) to the point where their density is increased significantly. "Substantially unprocessed" includes chopping into short lengths, i.e., chopped straw, rough grinding, as in ground corn husks, hammer milling, and like processes which leave a relatively porous and low density product which can be added to more dense material in the agglomerating stage, prior to compaction. Material of low density which has been reduced to a fineness or processed such that the density is too high to allow substantial density adjustment does not qualify as "substantially unprocessed" as that term is used herein.

What is claimed is:

1. A seed-containing mulch product, comprising a seed component having an average density of X, and mulch flakes having a density of X±0.5X, said mulch flakes prepared by agglomerating one or more digested or undigested natural lignocellulosic raw materials and/or sewage sludge raw material and compacting into a compacted product which is comminuted to said mulch flakes.

2. The mulch product of claim 1, further comprising one or more fertilizer components.

3. The mulch product of claim 1, wherein said step of agglomerating comprises digesting lignocellulosic raw materials to generate a natural binder in situ, followed by compacting to prepare a flakeable mulch precursor product.

4. The product of claim 1, wherein said step of agglomerating comprises applying one or more natural or synthetic binders to lignocellulosic material followed by compacting to prepare a flakeable mulch precursor product.

5. The product of claim 1, wherein said lignocellulosic raw material comprises one or more of comminuted wood, leaves, straw, seed husks, compost, or lignocellulosic waste products of industrial processing.

6. The product of claim 1, wherein said mulch comprises sewage sludge raw material.

7. The product of claim 1, wherein prior to compacting, one or more substantially unprocessed density adjusting natural materials are added.

8. The product of claim 7 wherein at least a portion of said density adjusting material is selected from paper flakes and low density natural lignocellulosic products.

9. The product of claim 1 further comprising a low density natural lignocellulosic material in an amount of less then 30 weight percent based on the weight of the product.

10. The product of claim 1, further comprising natural or synthetic fibers admixed with said seed and said mulch flakes.

11. A process for the preparation of a mulch product suitable for admixture with seed having a density of X, said mulch product having a density of X±0.5X, said process comprising a) selecting a raw material selected from the group consisting of natural lignocellulosic materials, paper, and sewage sludge;

b) agglomerating said raw material by incorporating a natural or synthetic binder;

c) optionally adding a density lowering amount of paper or a natural lignocellulosic product; and d) compacting to form a mulch product.

12. The process of claim 11 wherein said step of agglomerating comprises digesting lignocellulosic material to generate a binder in situ.

13. The process of claim 11, wherein said step of agglomerating comprises adding a natural or synthetic binder.

14. The process of claim 11, wherein said process further comprises adding a fertilizer to said product prior to compacting.

15. The process of claim 11, wherein prior to said step of compaction, a lignocellulosic product of low density is incorporated to lower the density of said mulch product.

16. The process of claim 11, wherein said binder is selected from the group consisting of natural vegetable gums, starches, sugars, plant extracts, shellac, animal origin adhesives; synthetic formaldehyde condensates, polyacrylates, novolac resins, epoxy resins; and mixtures thereof.

17. A flaked mulch product, comprising mulch particles having a longest average dimension less than 10 mm, prepared by comminuting the mulch product of claim 11.

18. The flaked mulch product of claim 17, prepared by extruding said compacted mulch product to form an extrudate, drying at least the surface of said extrudate, and comminuting said extrudate.

19. The flaked mulch product of claim 18 wherein at least a portion of said mulch product are in the form of platelets.

20. The flaked mulch product of claim 19, further comprising a surfactant.

21. The flaked mulch product of claim 18, further comprising a water absorbent.

22. The seed-containing mulch product of claim 1, wherein at least 50 number percent of said seed is enclosed within or attached to said mulch flakes.

* * * * *